July 14, 1953  K. DUTSCHKE  2,645,753
TEST DEVICE
Filed Nov. 14, 1949
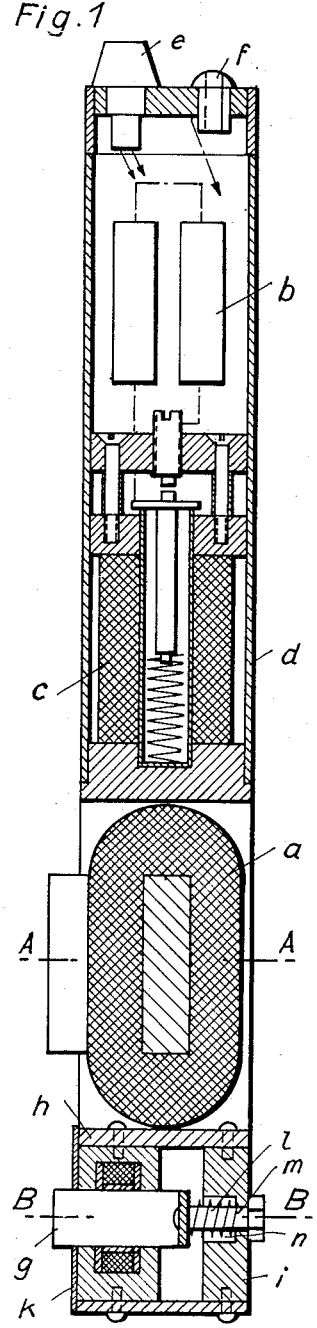
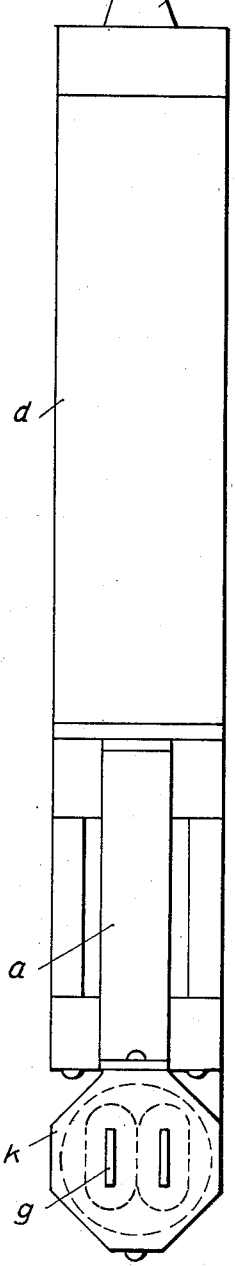
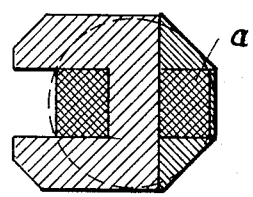
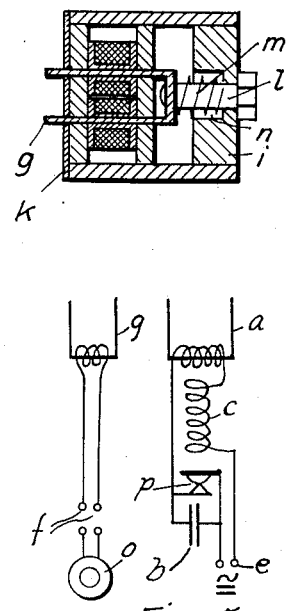
INVENTOR
KURT DUTSCHKE Patented July 14, 1953

2,645,753

UNITED STATES PATENT OFFICE 2,645,753

TEST DEVICE

Kurt Dutschke, Zirndorf, near Nurnberg, Germany

Application November 14, 1949, Serial No. 127,031
In Germany October 1, 1948

7 Claims. (Cl. 324—51)

This invention relates to a test device for armatures and stators, i. e. an apparatus for testing and fault location tests in armatures and stators.

Conventional test devices of this kind comprise an exciting magnet connected in series with a condenser and a circuit breaker, and a detector magnet having an earphone connected thereto. The current of the exciting magnet produces in the defective coil a current by which a secondary current is induced in the detector magnet which current is audible in the earphone.

It will be understood that in using such test devices, the detector magnet must not get into the magnet leakage field of the exciting magnet. The conventional devices of this kind therefore do not permit the testing of smaller armatures at the same limb of the coil which is exposed to the field of the exciting magnet.

It is the object of the present invention to provide a test device which permits the testing of even smaller armatures and stators at the same coil limb which is acted upon by the exciting magnet.

Another object of the invention is to provide a test device which permits the testing of stators from inside at the same coil limb.

Still another object of the invention is to provide a test device of the type referred to which is adapted to be operated single-handed.

With these objects in view, according to the present invention the detection magnet is structurally combined with the exciting magnet and screened against the magnetic leakage field thereof, more particularly by a steel cover surrounding the detection magnet. Preferably the detection magnet is coaxially arranged with the longitudinal main casing and the exciting magnet, i. e. on top of the latter. The head receiver is advantageously arranged at the end of the casing opposite the detection magnet. The whole device preferably is designed in the shape of a rod or bar.

My novel device permits the tests above mentioned which so far could not be carried out, and it can be operated single-handed, so that the second hand of the operator is free for other purposes. The device forms a constructional unit and due to its rod shape is particularly suitable for internal tests. Moreover, it is easy to make and very handy in use.

Other and further objects, features and advantages of the invention will be pointed out hereinafter and appear in the appended claims forming part of the application.

In the accompanying drawings a now preferred embodiment of the invention is shown by way of illustration and not by way of limitation.

In the drawings:

Fig. 1 is a longitudinal section through a testing device having the invention applied thereto, Fig. 2 is a plan view thereof, Fig. 3 is a section on line A—A of Fig. 1, Fig. 4 is a section on line B—B of Fig. 1, and Fig. 5 is a circuit diagram.

Similar reference characters denote similar parts in the different views.

Referring now to the drawings in greater detail, it will be seen that the testing device comprises an exciting or energizing magnet $a$, whose iron core advantageously has the shape of an open transformer, the condensers $b$ and the circuit breaker $c$. The condensers $b$ and the circuit breaker $c$ are accommodated in a tubular casing $d$. The device can be connected to the lighting or power system by means of a cable to be connected at $e$ and a connecting plug (not shown).

The plug sockets $f$ also provided at the rear end of the casing $d$ serve to connect a head receiver (not shown) to a detection magnet $g$ which is arranged in front of the exciting magnet $a$ and screened against the leakage field thereof by a steel shield $h$ forming together with a bottom $i$ and a cover $k$ a casing in which the detection magnet $g$ is resiliently supported. To this end the bolt or pin $l$ which is surrounded by a helical spring $m$, is axially slidable in the bore $n$ of the bottom $i$. The spring $m$ tends to hold the magnet $g$ in the position as shown.

As will be seen from the drawing, the casing $d$, the exciting magnet $a$ and the detection magnet $g$ are coaxially combined in such a way that the device forms a rod-shaped integral unit.

The D. C. or A. C. voltage taken from the lighting system is interrupted or chopped by the circuit breaker $c$, whereby current impulses of a high intensity are produced under action of the condensers $b$. The current supplied to the coil of the exciting magnet $a$ when moving about the armature or the stator will induce a powerful energizing current in each coil. If the faulty coil has a short circuit, a current will flow in it which in its turn will produce an induction current in the detection magnet, which will be heard in the headphone $o$. Thus, any fault in the armature or stators of D. C., A. C. and three-phase current motors can be ascertained unexceptionally.

Fig. 5 is a circuit diagram which shows the corresponding parts $a$, $b$, $c$, $e$, $f$ and $g$ as in Figs.

1 to 4, and in addition a headphone o and breaker contacts p.

My novel testing device can be operated single-handed. Therefore, the other hand can be used to make notes or other manipulations. Owing to its slender shape the device can be used also for internal tests even in case of small dimensions of the stators. Owing to the appropriate screening of the detection magnet it is protected against all influence by the magnetic leakage field of the exciting magnet.

In the embodiment as shown the magnetic leakage field of the exciting magnet is neutralized as to its effect upon the detector magnet by a screening cover, more particularly a steel cover enclosing and shielding the detector magnet. It will be understood that the neutralization of the leakage field may also be effected in any other suitable manner, e. g., by arranging the detector magnet at a sufficient distance from the exciting magnet.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. In a testing apparatus for armatures and stators, a tubular casing consisting of at least two casing parts, of which each has openings therein, a detector magnet disposed in one casing part with its poles projecting laterally through the openings therein, an exciter magnet in the other casing part directly adjacent the detector magnet and having its magnet poles projecting through the openings in said casing part on the same side as the detector magnet poles, interrupter means and condensers in the said other casing part, one supply lead from the said exciter magnet to the interrupter means and the condensers consisting of a coil or contacts, one lead from detector magnet being connected to an earphone, at least one of the said casing parts being made of a material of high magnetic conductivity whereby all elements are disposed close to each other in series.

2. In a testing apparatus according to claim 1, in which the material of high magnetic conductivity is steel.

3. In a testing apparatus according to claim 1, in which the casing part which is made of a material of high magnetic conductivity is the one which surrounds the detector magnet.

4. In a testing apparatus according to claim 1, in which guide means are provided for the detector magnet in which it is slidable, and spring means are provided for urging the detector magnet outwardly through the openings and against a stop.

5. In a testing apparatus according to claim 1, in which the current conductors to the exciter magnet and the detector magnet are connected to the same end of the tubular casing.

6. In a testing apparatus for armatures and stators, a tubular casing consisting of a plurality of parts, of which the first part is of circular cross section and useable as a handle, an electromagnet with interrupter contacts and condensers disposed within the said casing part, an exciter magnet of the open transformer type adjoining the said first part and having windings in series with the winding of the interrupter magnet and interrupter contacts, the said condensers being in parallel with the said interrupter contacts, current conductors to the said exciter magnet, interrupter means and condensers, and connected to the end of the first casing part remote from the exciter magnet, a further casing part directly adjoining the exciter magnets and the walls of said casing part being made of a material of high magnetic conductivity, and said casing part housing a detector magnet the poles of which extend through openings in the said housing part on the same side as the poles of the exciter magnet, guides for the detector magnet core at right angles to the said openings in which guides the detector magnet core is slidable, spring means between said core and the housing urging the core outwardly against a stop, and current leads to the coil of the said detector magnet and connected to the same end of the said first casing part as the current conductor to the exciter magnets.

7. In a testing apparatus for armatures and stators, a tubular casing consisting of at least two parts, a detector magnet in one of said casing parts having its poles projecting laterally through openings in said part, an exciter magnet in the second casing part directly adjoining the detector magnet and having poles extending through the casing part on the same side as the poles of the detector magnet, a current conductor to the said exciter magnet and attached to one end of the said tubular casing parts, interrupter means and condensers in the circuit of the said exciter magnet, a second conductor to the detector magnet for connection with an earphone, and means for screening the detector magnet from the stray field of the exciter magnet.

KURT DUTSCHKE.

References Cited in the file of this patent

UNITED STATES PATENTS

| Number | Name | Date |
|---|---|---|
| 556,646 | Scott | Mar. 17, 1896 |
| 1,523,398 | Ceccarini | Jan. 20, 1925 |
| 1,818,318 | Goddard | Aug. 11, 1931 |
| 1,924,913 | Chapman | Aug. 29, 1933 |
| 1,978,252 | Drake | Oct. 23, 1934 |

FOREIGN PATENTS

| Number | Country | Date |
|---|---|---|
| 80,629 | Sweden | Apr. 12, 1934 |